July 26, 1938.  B. D. BEDFORD  2,125,096
ELECTRIC POWER TRANSMISSION SYSTEM
Filed Oct. 9, 1937
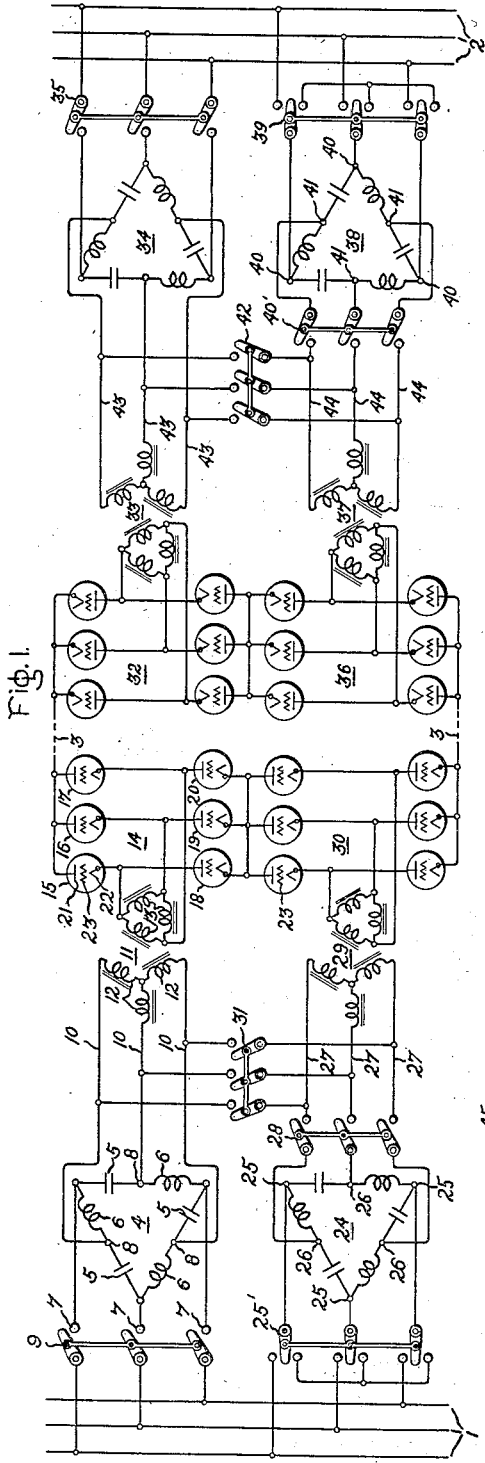
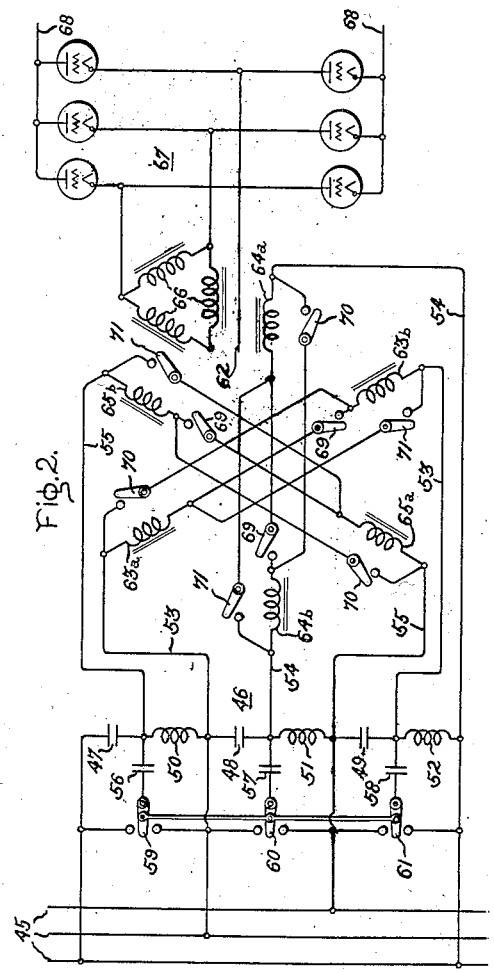
Inventor:
Burnice D. Bedford,
by Harry E. Dunham
His Attorney.

Patented July 26, 1938

2,125,096

UNITED STATES PATENT OFFICE 2,125,096

ELECTRIC POWER TRANSMISSION SYSTEM

Burnice D. Bedford, Schenectady, N. Y., assignor to General Electric Company, a corporation of New York Application October 9, 1937, Serial No. 168,220

15 Claims. (Cl. 171—97)

My invention relates to electric power transmission systems and more particularly to electric power transmission systems of the type described and claimed in United States Letters Patent 1,990,758 granted February 12, 1935, on application of Charles W. Stone, and assigned to the assignee of the present invention.

Briefly described, the system as disclosed in the Stone patent shows a source of energy of constant voltage alternating current which is transformed to alternating current of constant value and then rectified by an alternating current rectifier for transmission at high voltage direct current. The constant direct current is transmitted over a transmission line to a receiving circuit which includes an electric valve inverter for changing the transmitted energy to alternating current of constant value which is transformed to alternating current of constant voltage for distribution purposes or for connection with other constant voltage alternating current systems. The electric valve converting circuits employ networks of the monocyclic type for transforming alternating current from constant voltage to constant current, or vice versa. These networks comprise reactances of opposite sign such as inductive reactances and capacitive reactances. There has been evidenced a decided need for arrangements in systems of this nature to control the value of current at which energy is transmitted over the direct current transmission line in order to control the amount of the power losses incident to the terminal apparatus and to control the losses of the transmission line under varying load conditions. This type of control has become important in order to operate transmission systems of this nature at high efficiencies over wide ranges of energy transfer.

It is an object of my invention to provide a new and improved electric valve power transmission system.

It is another object of my invention to provide a new and improved electric valve power transmission circuit for transmitting electric power at constant current.

It is a further object of my invention to provide a new and improved system for controlling the current level at which energy is transmitted by a system of the type described in the above mentioned Stone patent.

In accordance with one feature of an illustrated embodiment of my invention, I provide an improved system for controlling and operating constant current alternating current systems in which a plurality of circuits are operated in parallel to transmit power from or to a constant voltage circuit or circuits. Each of the constant voltage-constant current circuits includes suitable means, such as a monocyclic network, for transforming constant voltage alternating current to alternating current of constant value, or vice versa. Since the systems operate at constant current, the light load losses are substantially the same as under full load conditions and the efficiency of the systems is materially reduced. I provide suitable circuit controlling means, such as switching apparatus, associated with the monocyclic networks and the constant current circuits to permit isolation of certain of the monocyclic networks under light load conditions, and which permit the operation of a number of constant current circuits from a single monocyclic network during light load conditions thereby reducing the current levels in a constant current circuits and effecting an improvement in operating efficiency of the system. Other means such as switching apparatus is also provided to short circuit the constant voltage terminals of a monocyclic network in such a system during light load operating conditions, thereby reducing the losses and increasing the efficiency of the system.

In accordance with another feature of an illustrated embodiment of my invention, I provide an improved electric valve power transmission system of the type described in the above mentioned Stone patent for transmitting electrical energy in the form of high voltage direct current of constant value. The system is illustrated as applied to an arrangement for transmitting energy between two constant voltage alternating current circuits and includes sending end and receiving end translating apparatus which connect the transmission system to the respective circuits and effect the desired transformation between constant current direct current and constant voltage alternating current. The terminal translating apparatus at the sending and receiving ends are similar in construction and arrangement and each includes a plurality of electric circuits for transforming the constant voltage alternating current to direct current of constant value, or vice versa. More specifically, each of the electric circuits includes a transforming means such as a monocyclic network comprising a plurality of branches of serially connected reactances of opposite sign, such as inductances and capacitances, for transforming the constant voltage alternating current to alternating current of constant value. The monocyclic networks are provided with constant voltage terminals which are connected to the constant voltage circuit and also include constant current terminals which are connected to constant current alternating current circuits. Electric valve means are interposed between the constant current direct current circuit and the constant current alternating current circuits to transmit energy therebetween. Suitable switching means are connected between the various constant current alternating current circuits in the several electric circuits to permit the energization of the electric valve means in one of the circuits from a monocyclic network in another of the circuits, and other suitable switching means are associated with the monocyclic networks to connect the constant voltage terminals of the monocyclic networks to the constant voltage alternating current circuit, or to short circuit the constant voltage terminals, thereby effecting a reduction in the value of direct current which is maintained in the constant current direct current transmission circuit and provide an arrangement for reducing the power losses in the terminal apparatus under light load operating conditions. Other suitable switching apparatus is also provided to permit complete disconnection or isolation of a monocyclic network in one of the electric circuits under light load conditions to eliminate the losses incident to the operation of the monocyclic network under corresponding load conditions.

In accordance with a further illustrated embodiment of my invention I provide another arrangement for controlling the value of the current which is maintained in the constant current direct current transmission line which comprises an inductive network interposed between the monocyclic network and the electric valve means. The inductive network includes a transformer having a plurality of primary windings for each phase. Suitable switching apparatus is associated with the windings to permit the connection of the various primary phase windings in series or parallel relation to effect the desired control of the current level at which energy is transmitted and hence control the losses of the terminal apparatus under light load operating conditions.

For a better understanding of my invention, reference may be had to the following description taken in connection with the accompanying drawing and its scope will be pointed out in the appended claims. Figs. 1 and 2 of the accompanying drawing show diagrammatically my invention as applied to an electric valve power transmission system of the type described in the above mentioned Stone patent.

Referring now to Fig. 1 of the accompanying drawing, I provide an improved electric valve transmission system for transmitting energy between a constant voltage alternating current circuit 1 and a constant voltage alternating current circuit 2 over a high voltage constant current direct current transmission line 3. The system includes terminal translating apparatus associated with the respective constant voltage alternating current circuits. Considering the translating apparatus associated with the constant voltage alternating current circuit 1, the apparatus includes a plurality of electric circuits for effecting the transfer of energy from the constant voltage circuit to the constant current transmission line 3. For example, the upper electric circuit connected to circuit 1 includes a transforming means, such as monocyclic network 4, for transforming constant voltage alternating current to alternating current of constant value, or vice versa. The monocyclic network 4 includes a plurality of branches of serially connected reactances of opposite sign such as capacitances 5 which are connected in series relation with inductances 6; and the monocyclic network 4 is provided with constant voltage terminals 7 and constant current terminals 8. The constant voltage terminals 7 may be connected to the constant voltage circuit 1 through suitable switching apparatus 9, and the constant current terminals 8 are connected to a polyphase constant current alternating current circuit 10. A suitable inductive network, such as a transformer 11 having primary windings 12 and secondary windings 13 is interposed between the constant current alternating current circuit 10 and an electric valve translating apparatus 14 to effect the desired voltage transformation therebetween. The electric valve apparatus 14 includes electric valves 15–20, inclusive, which may operate either as a full wave rectifier or as an inverter depending on the direction of energy transfer between the constant voltage circuits 1 and 2. The electric valves 15–20 include an anode 21, a cathode 22, and a control member 23, and are preferably of the type employing an ionizable medium such as a gas or a vapor.

Considering now the lower electric circuit connected to the constant voltage circuit 1, it is to be understood that this circuit is similar in construction and arrangement to the upper circuit and includes a monocyclic network 24 having constant voltage terminals 25 and constant current terminals 26. A circuit controlling means, such as a switch 25', may be connected to the constant voltage terminals 25 and may be arranged to connect the monocyclic network 24 to the circuit 1 when in the upper position, and to short circuit the constant voltage terminals when in the lower position. The constant current terminals 26 may be connected to a constant current alternating current circuit 27 through a suitable circuit controlling means such as a switch 28, and the constant current alternating current circuit 27 is connected to a transformer 29 which effects the desired voltage transformation between the circuit 27 and the electric valve translating apparatus 30, which in turn is connected to the constant current direct current transmission line 3. The electric valve apparatus 30 is connected in series relation with the electric valve apparatus 14 and the two electric valve groups are connected across the transmission line 3. The electric valves of the electric valve apparatus 30 are also of the type employing an ionizable medium and may operate either as a full wave rectifier or as an inverter, depending upon the direction of energy transfer between circuits 1 and 2. It, of course, is to be understood that in the event energy is being transmitted from circuit 2 to circuit 1, the electric valve groups 14 and 30 must operate as inverters to transform direct current to alternating current, and under such conditions of operation it is necessary to control the conductivities of the various valves thereof by proper energization of the control members 23. The control circuits for members 23, for the purpose of simplifying the explanation of the present invention, have not been shown. Any conventional excitation circuit may be used for this purpose and I have found that I may use an excitation system of the type shown and described in United States Letters Patent No. 1,935,464, granted November 14, 1933, upon an application of Clodius H. Willis and assigned to the assignee of the present application.

As an agency for controlling the values of current maintained in the constant current alternating current circuits 10 and 27 and for controlling the value of direct current which is maintained in the constant current transmission line 3, I employ a suitable circuit controlling means, such as a switch 31, which is interposed between the constant current alternating current circuit 10 of the upper electric circuit and the corresponding circuit 27 of the lower electric circuit. The switch 31 connects the circuits 10 and 27 in parallel relationship and permits the energization of transformer 29 and the electric valve apparatus 30 from the monocyclic network 4. When the switches 28 and 31 are closed and the switch 25' is moved to the lower position to short circuit the constant voltage terminals 25 of the monocyclic network 24, the current output of the monocyclic network 4 is divided equally between transformer 11 and transformer 29, thereby effecting a fifty per cent reduction in the value of the direct current which is maintained in the direct current transmission line 3 as compared with the value transmitted when both the upper and lower circuits are operating independently. Of course, switch 31 may be maintained in the closed position and switches 25' and 28 maintained in the open positions to effect energization of transformer 29 from the monocyclic network 4, and also effecting complete isolation of the monocyclic network 24. This system of switching apparatus provides an expedient and convenient arrangement for lowering the current level at which energy is transmitted between circuits 1 and 2 and also provides a suitable arrangement for controlling or reducing the power losses of the terminal apparatus under light load operating conditions.

The terminal apparatus associated with the constant voltage alternating current circuit 2 is similar in construction and arrangement to that described above in connection with circuit 1. Briefly stated, the upper electric circuit of the terminal apparatus associated with circuit 2 includes an electric valve translating apparatus 32, a transformer 33, a monocyclic network 34 and a switching means 35. The lower circuit comprises an electric valve translating apparatus 36, a transformer 37 and a monocyclic network 38. It is to be understood that the electric valve groups 32 and 36 may operate either as rectifiers or as inverters, and it is to be noted that the electric valve groups 32 and 36 are connected in series relation with each other and connected across the direct current transmission line 3. A switching means 39 may be connected to the constant voltage terminals 40 of the monocyclic network 38 to connect these terminals to the constant voltage circuit 2 or to short circuit these terminals. Constant current terminals 41 of the monocyclic network 38 are connected to a switching means 40' to provide a means for isolating the monocyclic network 38; and a switching means 42 is employed to interconnect constant current alternating current circuits 43 and 44 of the upper and lower electric circuits, respectively. The switching means 42 provides an arrangement for energizing the transformer 37 and the electric valve group 36 from the monocyclic network 34 in the upper circuit and provides an arrangement for controlling the current level at which energy is transmitted over the constant current direct current transmission line 3.

The general principles of operation of the transmission system shown in Fig. 1 of the accompanying drawing are explained in the above mentioned Stone patent. The operation of the system will be explained briefly by considering the system when energy is being transmitted from the constant voltage circuit 1 to the constant voltage circuit 2. Switches 9 and 35, of course, will be maintained in the closed circuit position and switches 25' and 39 will be initially considered as being in the upper positions to connect the monocyclic networks 24 and 38 to the constant voltage circuits 1 and 2, respectively. Switches 28 and 40' will be maintained in the closed circuit positions and switches 31 and 42 initially placed in the open circuit positions. Under these conditions, the electric circuits at the sending and receiving ends of the system will transmit current independently to the respective associated electric valve groups to supply constant current direct current to the transmission line 3. More specifically, the various monocyclic networks transform constant voltage alternating current to alternating current of constant value and vice versa; and the electric valve groups transform the constant current alternating current to direct current of constant value and vice versa. The various electric valve groups at the receiving and sending ends are connected in series relation so that the voltages generated thereby, or impressed thereon, act in series relationship. As will be well understood, since the system is inherently a constant current system the variations in load requirements of the circuit 2 will effect a change in the value of the direct current voltage appearing between the conductors of the direct current transmission line 3. Since the system is designed to maintain a constant current in the transmission line 3, it will be understood that as the load requirements of circuit 2 decrease the voltage appearing between the conductors of the direct current circuit 3 will also be reduced materially. However, since the monocyclic networks 4 and 24 at the sending end and the monocyclic networks 34 and 38 at the receiving end inherently operate to maintain a constant current condition, the losses occasioned by the terminal apparatus, particularly the monocyclic networks and the associated transformer networks, will be maintained at a substantially constant value effecting a material reduction in the efficiency of the transmission system.

When it is desired to increase the system efficiency under light load operating conditions, the switching apparatus associated with the terminal translating apparatus at the sending and receiving ends of the system may be manipulated to reduce materially the system losses, particularly the losses of several of the monocyclic networks, the losses of the transformer networks and the losses of the transmission line. To effect this reduction in power losses, switches 25' and 39 may be moved to the lower positions to short circuit the monocyclic networks 24 and 38, respectively, and switches 31 and 42 may be moved to the closed circuit position to connect the constant current alternating current circuits 27 and 44 in parallel with the constant current alternating current circuits 10 and 43, respectively. Since the monocyclic networks 24 and 38 are no longer connected to the constant voltage circuits 1 and 2, respectively, the monocyclic networks 4 and 34 will energize or receive energy from both of the electric circuits at the respective ends of the transmission system. More particularly, monocyclic network 4 will energize transformer 29 and electric valve group 30 as well as transformer 11 and electric valve group 14. In like manner, monocyclic network 34 at the receiving end will receive energy from electric valve groups 32 and 36 and transformers 33 and 37. Considering in particular the terminal apparatus associated with circuit 1, since the monocyclic network 4 maintains a predetermined constant alternating current output, the current will divide equally between transformer 11 and transformer 29, effecting thereby a fifty per cent reduction in the value of the direct current supplied to the transmission line 3. The voltage, however, will assume a proper value to meet the load requirements of circuit 2. Since the currents in the transformer networks and the transmission line 3 have been reduced by one half, the power losses will be reduced to approximately 25 per cent of the previous conditions when both circuits are supplying energy through the respective monocyclic networks.

Of course, switches 25' and 39 and 28 and 40' may be maintained in the open circuit positions to isolate completely the monocyclic networks 24 and 38 under light load operating conditions, thereby completely eliminating the power losses incident to the operation of these monocyclic networks when the constant voltage terminals thereof are short circuited.

Although the operation of the embodiment of my invention shown in Fig. 1 has been explained for that condition in which energy is transmitted from the constant voltage alternating current circuit 1 to the constant voltage alternating current circuit 2, it is to be understood that the system may be operated to transmit energy in either direction. Furthermore, it is to be understood that I may employ three or more circuits at the receiving and transmitting ends of the system instead of the two circuits shown in Fig. 1. If three or more circuits are employed, it is clear that the associated circuits may be interconnected by switches performing functions corresponding to those performed by switches 31 and 42 to control the current level at which energy is transmitted over the direct current transmission line.

In Fig. 2 of the accompanying drawing there is diagrammatically illustrated another embodiment of my invention for controlling the current level at which energy is transmitted over a high voltage, constant current, direct current transmission system. To facilitate description of the arrangement, I have chosen to represent the terminal apparatus associated with only one of the constant voltage constant current circuits. The arrangement shown in Fig. 2 illustrates the terminal apparatus which is connected to a constant voltage alternating current circuit 45 and includes a monocyclic network 46 comprising capacitances 47, 48 and 49 which are respectively connected in series relation with inductances 50, 51 and 52 across the respective phases of the constant voltage circuit 45. The monocyclic network 46 operates to transform constant voltage alternating current to alternating current of constant value and supplies a polyphase constant current system including conductors 53, 54 and 55. As an agency for controlling the magnitude of the current output of the monocyclic network 46, I have chosen to employ an arrangement described and claimed in a copending patent application of C. H. Willis et al., Serial No. 70,575, filed March 24, 1936, and assigned to the assignee of the present application. Control reactances, such as capacitive reactances 56, 57 and 58, are associated with branches of the monocyclic network to control the net or effective impedance thereof and may be controlled by suitable devices such as a switching device 59, 60 or 61 to connect the capacitances in the circuits to effect the desired control without disturbing the electrical symmetry of the monocyclic network 46. While I have chosen to show the control reactances as being capacitances, it is to be understood that I may employ inductances for this purpose if desired.

As an additional arrangement for controlling the current level at which energy is transmitted, I provide an inductive network, such as a transformer 62, having a plurality of primary windings for each phase. For example, the primary windings are 63a and 63b, 64a and 64b, and 65a and 65b. Secondary windings 66 are connected to an electric valve translating apparatus 67 which in turn is connected to a high voltage, constant current, direct current transmission line 68. The electric valves of the group 67 may operate either as a full wave rectifier or as an inverter depending upon the direction of energy transfer through the system. The primary windings of transformer 62 are connected to the monocyclic network 46 in the manner disclosed and claimed in my copending application Serial No. 97,011, filed August 20, 1936, and assigned to the assignee of the present invention.

To effect control of the current level at which energy is transmitted over the constant current direct current transmission line 68 by control of the primary windings of the transformer 62, I provide a plurality of switching devices for connecting the various windings for the respective phases in parallel relation or in series relation. For example, considering the constant current alternating current circuit comprising conductors 53, a switching device 69 serves to connect primary windings 63a and 63b in series relation and switches 70 and 71 serve to connect these windings in parallel relation. In like manner, the switching devices associated with phase conductors 54 and 55 serve as an arrangement to connect the respective primary phase windings of transformer 62 in series or parallel relationship.

The operation of the embodiment of my invention shown in Fig. 2 will be explained by considering the system when energy is being transmitted from the constant voltage alternating current circuit 45 to the direct current transmission system 68. It is to be understood that similar terminal apparatus is associated with other constant voltage circuits not shown. Let it be assumed that the switches 59, 60 and 61 are in the upper circuit position and that the values of the inductances and capacitances of the monocyclic network and the control capacitances are such that the monocyclic network 46 is in a balanced condition to supply a balanced system of constant alternating currents to the primary windings of transformer 62. Furthermore, let it be assumed that the switches 69 associated with the various primary phase windings are closed so that the primary windings are in series relation across the output terminals of the monocyclic network. The monocyclic network 46, of course, maintains constant current and these windings and the electric valve group 67 effect transmission of energy in the form of direct current of constant value over transmission line 68. If the load required by the circuit 68 decreases sufficiently so that the ratio of the power losses to the power output of the terminal apparatus is increased materially, the switches 70 and 71 may be closed and the switches 69 may be opened to decrease the current level at which energy is transmitted over the transmission line 68. The sequence in which the switches 69, 70 and 71 operate is important in that when all of the switches are open the output voltage of the network 46 will tend to rise to values which may injure the associated apparatus. Therefore, the switches 69, 70 and 71 should all be closed momentarily and switch 69 opened subsequently to effect this transition properly. Of course, the voltage output of the electric valve group 67 will change to effect the desired power output at the new current level, but the decrease in the current in the transmission line and the current supplied to the transformer 62 will effect a decrease in the power losses. When the windings for the arrangement shown in Fig. 2 are connected in parallel the power losses will be reduced to a value which is 25 per cent of that when the system is operating with the primary phase windings in series.

While I have shown and described my invention as applied to a particular system of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States is:

1. In combination, a constant voltage alternating current circuit, a constant current direct current circuit, a plurality of electric circuits for transmitting energy between said constant voltage circuit and said constant current circuit and each comprising a monocyclic network for transforming constant voltage alternating current to alternating current of constant value, said monocyclic network being provided with constant voltage terminals and constant current terminals, a constant current alternating current circuit connected to said constant current terminals and electric valve means connected between the constant current alternating current circuit and the constant current direct current circuit, means for connecting the various constant current alternating current circuits of said electric circuits in parallel relationship to energize the various electric valve means from a single monocyclic network in one of said electric circuits, and means for selectively controlling the constant voltage terminal connections of another monocyclic network to connect said constant voltage terminals thereof to said constant voltage circuit or to short circuit said constant voltage terminals.

2. In combination, a constant voltage alternating current circuit, a constant current direct current circuit, a plurality of electric circuits for transmitting energy between said constant voltage circuit and said direct current circuit and each comprising transforming means for transforming constant voltage alternating current to alternating current of constant value, a constant current alternating current circuit and electric valve means connected between the constant current alternating current circuit and the constant current direct current circuit, and means for connecting in parallel the various constant current alternating current circuits in said plurality of electric circuits to energize the electric valve means in one of the plurality of circuits from the transforming means in another of the electric circuits.

3. In an electric power transmission system the combination of a constant voltage alternating current circuit, a constant current direct current circuit, a plurality of electric circuits for transmitting energy between said constant voltage circuit and said direct current circuit and each comprising transforming means for transforming constant voltage alternating current to alternating current of constant value, a constant current alternating current circuit and electric valve means connected between the constant current alternating current circuit and the constant current direct current circuit, and means for controlling said electric circuits to effect energization of all of said electric valve means from one of said monocyclic networks to control the value of the current at which energy is transmitted by said direct current circuit.

4. In an electric power transmission system the combination of a constant voltage alternating current circuit, a constant current direct current circuit, a plurality of electric circuits for transmitting energy between said constant voltage circuit and said direct current circuit and each comprising transforming means for transforming constant voltage alternating current to alternating current of constant value, a constant current alternating current circuit and electric valve means connected between the constant current alternating current circuit and the constant current direct current circuit, and means connected between the various constant current alternating current circuits of said electric circuits for controlling the value of direct current which is transmitted to said direct current circuit.

5. In combination, a constant voltage alternating current circuit, a constant current direct current circuit, a plurality of electric circuits for transmitting energy between said constant voltage circuit and said direct current circuit and each comprising a monocyclic network for transforming constant voltage alternating current to alternating current of constant value, a constant current alternating current circuit and an electric valve means connected between the constant current alternating current circuit and the constant current direct current circuit, and means for controlling the value of direct current which is maintained in said direct current circuit comprising switching means connected between the various constant current alternating current circuits of said plurality of electric circuits and switching means associated with the monocyclic networks to selectively connect and disconnect said networks from said constant voltage alternating current circuit.

6. In combination, a constant voltage alternating current circuit, a constant current direct current circuit, a plurality of electric circuits for transmitting energy between said constant voltage circuit and said constant current circuit and each comprising monocyclic networks for transforming constant voltage alternating current to alternating current of constant value, said monocyclic networks being provided with constant voltage terminals and constant current terminals, a constant current alternating current circuit connected to said constant current terminals and electric valve means connected between the constant current alternating current circuit and the constant current direct current circuit, means for selectively controlling the constant voltage terminal connections of the monocyclic networks to connect said constant voltage terminals to said alternating voltage circuit or to short circuit said constant voltage terminals, and means interposed between the various constant current alternating current circuits of said electric circuits to connect said constant current alternating current circuits in parallel to effect energization of the electric valve means in each of said electric circuits from a single monocyclic network.

7. In combination, a constant voltage alternating current circuit, a second constant voltage alternating current circuit, a constant current direct current circuit, and individual terminal apparatus associated with the first mentioned constant voltage circuit and the second constant voltage circuit for effecting transfer of energy between the constant current direct current circuit and the respective constant voltage alternating current circuit, the terminal apparatus associated with each of said constant voltage alternating current circuits each comprising a plurality of electric circuits each including means for transforming constant voltage alternating current to alternating current of constant value, a constant current alternating current circuit, electric valve means connected between the associated constant current alternating current circuit and the constant current direct current circuit, the electric valve means in the electric circuits being connected in series relation and means connected between the various constant current alternating current circuits of the electric circuits for controlling the value of direct current which is transmitted to or received from said direct current circuit.

8. In combination, a constant voltage alternating current circuit, a second constant voltage alternating current circuit, a constant current direct current circuit, and individual terminal apparatus associated with the first mentioned constant voltage circuit and the second constant voltage circuit for effecting transfer of energy between the constant current direct current circuit and the respective constant voltage alternating current circuits, the terminal apparatus associated with each of said constant voltage circuits each comprising a plurality of electric circuits including a monocyclic network for transforming constant voltage alternating current to alternating current of constant value, a constant current alternating current circuit, electric valve means connected between the associated constant current alternating current circuit and the constant current direct current circuit, the electric valve means in the electric circuits of each terminal apparatus being connected in series relation, and switching means connected between the various constant current alternating current circuits for controlling the current level at which energy is transmitted between the constant voltage alternating current circuits.

9. In combination, a constant voltage alternating current circuit, a second constant voltage alternating current circuit, a constant current direct current circuit, and individual terminal apparatus associated with the first mentioned constant voltage circuit and the second constant voltage circuit for effecting transfer of energy between the constant current direct current circuit and the respective constant voltage alternating current circuits, the terminal apparatus associated with each of said constant voltage circuits comprising a plurality of electric circuits each including a monocyclic network for transforming constant voltage alternating current to alternating current of constant value, a constant current alternating current circuit, electric valve means connected between the associated constant current alternating current circuit and the constant current direct current circuit, the electric valve means in the electric circuits of each terminal apparatus being connected in series relation, and means comprising switching devices connected between the various constant current alternating current circuits of the electric circuits and switching devices interposed between monocyclic networks in each of said terminal apparatus for controlling the value of direct current which is transmitted to or received from said direct current circuit.

10. In combination, a constant voltage alternating current circuit, a constant current direct current circuit, a monocyclic network for transforming constant voltage alternating current to alternating current of constant value, said network having constant voltage terminals connected to said constant voltage circuit and having constant current terminals, a constant current alternating current circuit connected to said constant current terminals, an inductive network connected to said constant current alternating current circuit comprising a plurality of windings, electric valve means connected between said inductive network and said constant current direct current circuit, and means for controlling the impedance of said inductive network to control the value of the current transmitted by said constant current direct current circuit.

11. In combination, a constant voltage alternating current circuit, a constant current direct current circuit, a monocyclic network for transforming constant voltage alternating current to alternating current of constant value, said network having constant voltage terminals connected to said constant voltage circuits and having constant current terminals, a constant current alternating current circuit connected to said constant current terminals, an inductive network connected to said constant current alternating current circuit comprising a plurality of windings, an electric valve means connected between said inductive network and said constant current direct current circuit, and switching means for selectively connecting said plurality of windings in series relation or in parallel relation to control the value of the constant current transmitted by said constant current direct current circuit.

12. In combination, a constant voltage alternating current circuit, a plurality of electric circuits connected to said constant voltage circuit and each comprising transforming means for transforming constant voltage alternating current to alternating current of constant value and each including a constant current alternating current circuit, and means for interconnecting the various constant current circuits to energize at least two of said constant current circuits from a single transforming means to control the current level at which power is transmitted by the various constant current circuits.

13. In combination, a constant voltage alternating current circuit, a load circuit, a plurality of electric circuits for transmitting energy between said constant voltage circuit and said load circuit and each comprising transforming means for transforming constant voltage alternating current to alternating current of constant value and including a constant current alternating current circuit, and means for connecting in parallel the various constant current alternating current circuits in said plurality of electric circuits to energize said constant current circuits from one transforming means.

14. In combination, a constant voltage alternating current circuit, a plurality of electric circuits connected thereto and each comprising a monocyclic network for transforming constant voltage alternating current to alternating current of constant value and each including a constant current alternating current circuit, and means for isolating a monocyclic network in one of said electric circuits and for effecting energization of the associated constant current circuit from a monocyclic network in another of said electric circuits to control the current level at which power is transmitted in the constant current circuits.

15. In combination, a constant voltage alternating current circuit, a plurality of electric circuits connected thereto and each comprising a monocyclic network for transforming constant voltage alternating current to alternating current of constant value and each including a constant current alternating current circuit, and means for short-circuiting constant voltage terminals of one of the monocyclic networks and for energizing the associated constant current circuit from a monocyclic network in another of said electric circuits to control the current level at which power is transmitted by the constant current circuits.

BURNICE D. BEDFORD.